No. 890,875. PATENTED JUNE 16, 1908.
H. S. SAMUEL.
AWNING AND DUST SCREEN FOR VEHICLES.
APPLICATION FILED APR. 18, 1907.
2 SHEETS—SHEET 1.
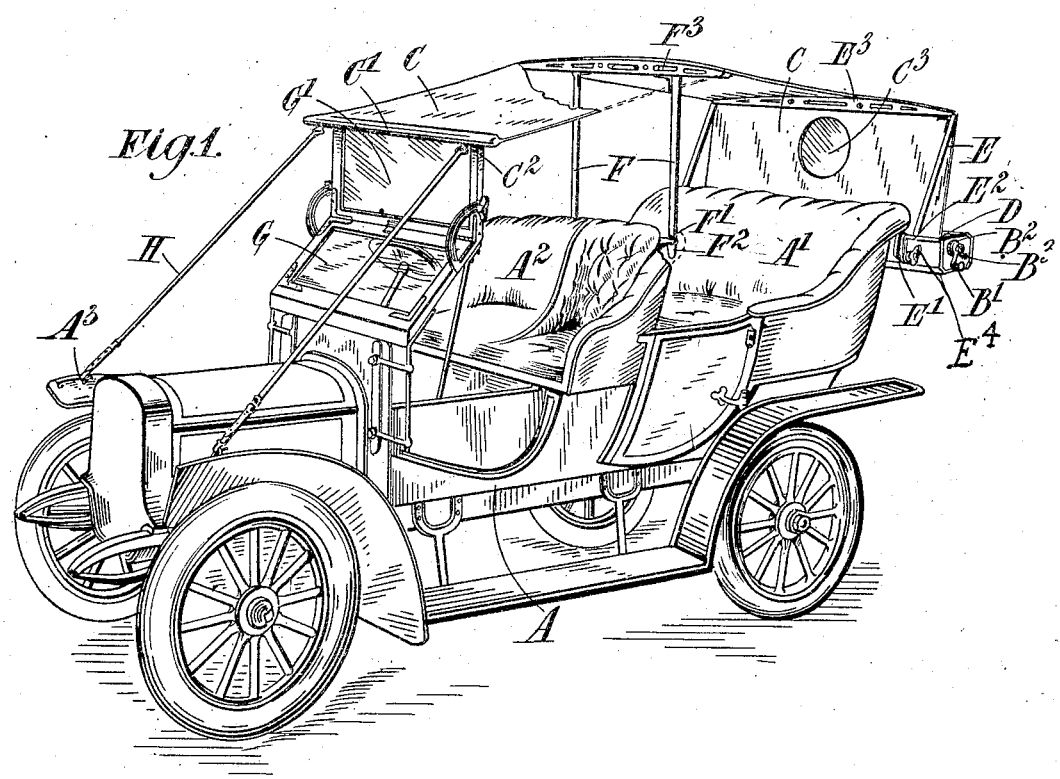
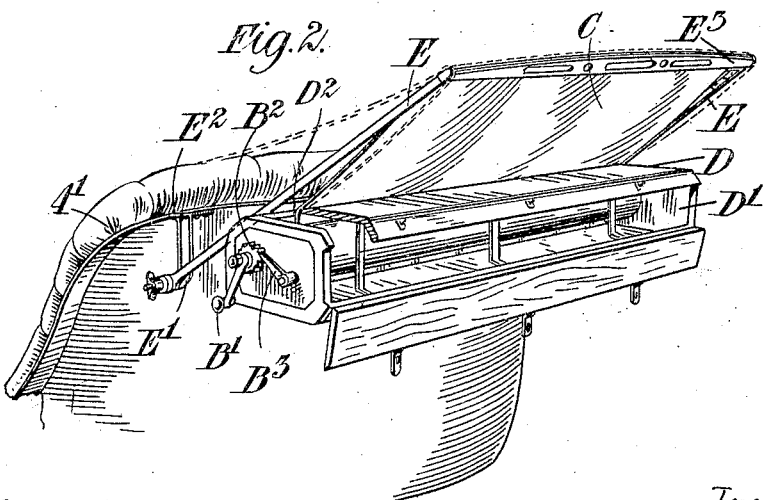
Witnesses
Thomas Durant
Elizabeth Trippett
Inventor
Henri Saul Samuel
by Church & Church
his Attys No. 890,875. PATENTED JUNE 16, 1908.
H. S. SAMUEL.
AWNING AND DUST SCREEN FOR VEHICLES.
APPLICATION FILED APR. 18, 1907.

2 SHEETS—SHEET 2.

Witnesses
Thomas Durant
Elizabeth Proffitt

Inventor:
Henri Saul Samuel
by Church & Church
his attys

UNITED STATES PATENT OFFICE.

HENRI SAUL SAMUEL, OF PAISLEY, SCOTLAND.

AWNING AND DUST-SCREEN FOR VEHICLES.

No. 890,875.

Specification of Letters Patent.

Patented June 16, 1908.

Application filed April 18, 1907. Serial No. 368,925.

*To all whom it may concern:*

Be it known that I, HENRI SAUL SAMUEL, a subject of the King of Great Britain, and residing at Paisley, in Scotland, have invented a new and useful Awning and Dust-Screen for Vehicles, of which the following is a specification.

This invention relates to an awning and dust screen for vehicles applicable especially to self-propelled vehicles for the purpose of excluding dust, rain, sun, etc.; the screen is applicable as a dust screen only at the back of the car, or it may be extended so as to form an awning or cover over all or some of the seats.

Figure 3:
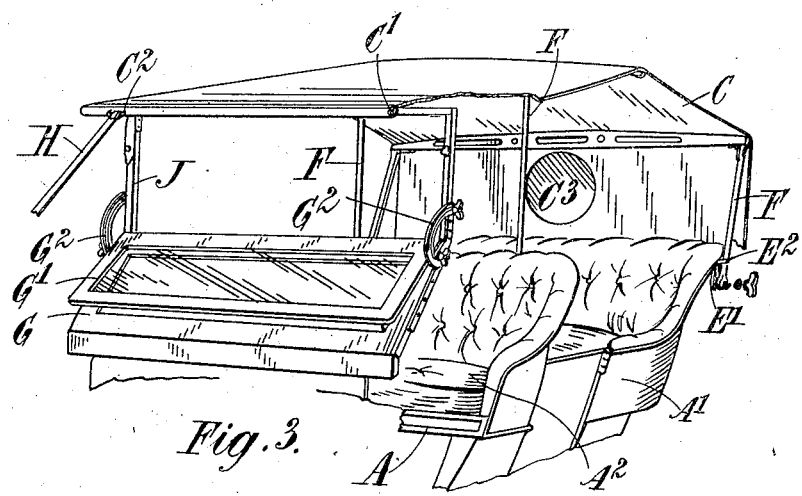
Figure 4:
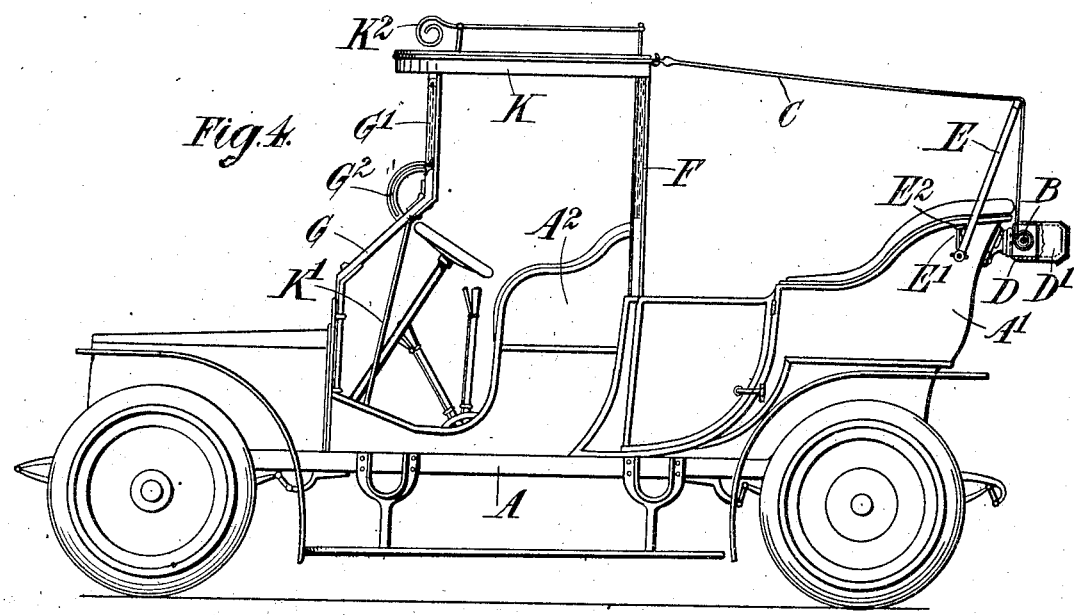

In the accompanying drawings Figure 1 is a perspective view of a motor vehicle having one form of awning and screen embodying this invention with a wind screen at the front. Fig. 2 illustrates the method of forming a dust screen. Fig. 3 is a perspective view of a vehicle having an awning according to this invention and having a wind screen folded down and replaced by a supporting frame. Fig. 4 illustrates the application of this invention to a vehicle of the landaulet type.

Referring to Figs. 1 and 2 a vehicle A is shown having a back seat or tonneau $A^1$ and a front seat $A^2$. At the back of the car or back seat $A^1$ and carried in suitable bearings or supports is a roller B upon which is wound a sheet C, preferably of waterproof canvas which serves as an awning or screen. The roller B can be rotated by means of a handle $B^1$ and carries a ratchet wheel $B^2$, and a pawl $B^3$ pivoted on the support or other fixed part is employed to retain the roller B in any desired position.

As shown a box or casing D is arranged at the back of the car to support the roller and to inclose the awning or screen when not in use; the rear portion $D^1$ of the box serves to contain all the detachable portions of the awning and its supports or attachments and side curtains if these be used. The roller and sheet are contained in the front portion of the box and the sheet is withdrawn through the slot $D^2$. The box or casing round the roller may, however, be dispensed with.

At or near the back of the car $A^1$ a rear frame E is pivoted on brackets $E^1$ at each side of the car. This frame can be laid back more or less horizontally or inclined, as shown in Fig. 2, when it conveniently abuts against the box D; or it may be raised up to a substantially upright position as shown in the other figures, in which case it abuts against fixed stops $E^3$ projecting from the back seat of the car $A^1$ and a nut $E^4$ is used to hold the frame fixed in either position.

At the back of the front seat $A^2$ is arranged another forward frame F which conveniently is provided at the bottom of its vertical members with ferrules $F^1$ which slip into sockets $F^2$ fixed to the back of the seat $A^2$.

The end of the awning is stiffened with a lath or stick $C^1$ carried in a pocket in the awning and if desired the edges may also be stiffened with some flexible material such as cord. The stiff end is provided with D-shaped fastenings $C^2$ by which it can be secured to hooks at various points on the car or frames. Thus, as illustrated in Fig. 2, when the apparatus is in use as a dust screen, the back frame E is laid back at an appropriate angle against the box D and the sheet C is unrolled to the required extent and hooked to the frame E, thus forming the dust screen. When the sheet C is used as a cover for the tonneau only the back frame E may be left in its lower position and the sheet may be carried forward over the tonneau as shown in dotted lines in Fig. 2, and the fastenings $C^2$ may be hooked to the back of the front seat. Or when the car is not in use the sheet may be pulled forward so as to cover the whole carriage portion and may or may not be secured to the dash or front of the vehicle.

Where it is desired to use the sheet as an awning extending over both seats as shown in Fig. 1, the back frame C is raised to its substantially upright position and the second frame F at the back of the front seat is also erected and the awning is drawn over these and extended to the front of the car where it is suitably secured. The vehicle illustrated in Fig. 1 is provided with a known form of folding wind screen G: the end of the awning C engages the top of the screen and the fastenings $C^2$ are connected by adjustable straps H to brackets $A^3$ fixed on the mud guards or other part of the front of the car. Again, if it is desired to arrange the awning only over the tonneau the end of the sheet C is secured to the forward frame F, thus leaving the front seat uncovered.

A section of celluloid or other flexible transparent material $C^3$ may be inserted in the awning so as to enable the occupants of the car to look through the back when the awning is up. The tops $E^2 F^3$ of the frames E and F are practically straight. As the roller B yields a little in the middle the upper surface of the tops E³ and F³ of the frames may have a slight curve to keep the sheet taut throughout.

Referring to Fig. 3 where a folding wind screen is used, it may be desirable to have the awning in use while the upper part G¹ of the screen is folded down. In this case an auxiliary frame J may take the place of the upper part of the screen as a support for the front of the awning and this frame J may be secured to the quadrants G² of the wind screen.

Referring to Fig. 4, the frame F at the back of the front seats may be closed in, preferably with transparent material. As illustrated in Fig. 4, the frame F is a permanent structure of wood or the like with a window which may be of glass. The front part of the vehicle is covered by a roof K extending from the top of the frame F to the top of the screen G and supported at the front by rods K¹. A luggage rail K² is provided on the roof. The awning C when in use is hooked or fastened to the top of the frame F as before.

What I claim as my invention and desire to secure by Letters Patent is:—

1. The combination of a vehicle, a rear frame pivotally connected thereto, means for holding the frame in an upright or in an inclined position, additional frames removably held upright in the vehicle, a rotatable roller extending across the rear of the vehicle, means for supporting the roller, a sheet wound on said roller and extensible therefrom, and securing means carried by the sheet whereby it may be secured over the vehicle to form an awning or to the rear frame to form a dust guard.

2. The combination of a vehicle, a rear frame pivotally connected thereto, means for holding the frame in an upright or in an inclined position, additional frames removably held upright in the vehicle, a rotatable roller extending across the rear of the vehicle, means for supporting the roller, a sheet wound on said roller and extensible therefrom, means for turning the roller at will, and securing means carried by the sheet whereby it may be secured over the vehicle to form an awning and to the rear frame to form a dust guard.

3. The combination of a vehicle, a rear frame pivotally connected thereto, means for holding the frame in an upright or in an inclined position, additional frames removably held upright in the vehicle, a rotatable roller extending across the rear of the vehicle, means for supporting the roller, a sheet wound on said roller and extensible therefrom, means for turning the roller at will, means for fixing the roller at any position, and securing means carried by the sheet whereby it may be secured over the vehicle to form an awning and to the rear frame to form a dust guard.

4. The combination of a vehicle, a rear frame pivotally connected thereto, means for holding the frame in an upright or in an inclined position, additional frames removably held upright in the vehicle, a rotatable roller extending across the rear of the vehicle, means for supporting the roller, a sheet wound on said roller and extensible therefrom, means for turning the roller at will, means for fixing the roller at any position, securing means carried by the sheet whereby it may be secured over the frame to form an awning or to the rear frame to form a dust guard, a folding wind screen at the front of the vehicle and means for supporting the sheet over the wind screen when folded.

5. The combination of a vehicle, a rear frame pivotally connected thereto, means for holding the frame in an upright or in an inclined position, additional frames removably held upright in the vehicle, a rotatable roller extending across the rear of the vehicle, means for supporting the roller, a sheet wound on said roller and extensible therefrom, means for turning the roller at will, means for fixing the roller at any position, securing means carried by the sheet whereby it may be secured over the frames to form an awning or to the rear frame to form a dust guard at the front of the vehicle, means for supporting the sheet over the wind screen when folded, and adjustable means for connecting the front of the sheet with the front of the vehicle.

6. The combination of a motor vehicle, a rectangular metal rear frame pivoted at the rear thereof, means for holding said frame in an upright or in an inclined position, a roller rotatably mounted at the rear of the vehicle, a waterproof canvas sheet wound on said roller, fastenings carried by the sheet whereby it may be secured over the vehicle to form an awning or to the rear frame to form a dust guard.

7. The combination of a motor vehicle, supporting brackets secured to the rear thereof, a rectangular metal rear frame pivoted to said brackets, means for holding said frame in an upright or in an inclined position, a roller rotatably mounted at the rear of the vehicle, fastenings carried by the sheet whereby it may be secured over the vehicle to form an awning or to the rear frame to form a dust guard.

8. The combination of a motor-vehicle, supporting brackets secured to the rear thereof, a rectangular metal rear frame pivoted to said brackets, means for holding said frame in an upright or in an inclined position, a forward frame removably held upright in the vehicle, a roller rotatably mounted at the rear of the vehicle, a waterproof canvas sheet wound on said roller, fastenings carried by the sheet whereby it may be secured over the vehicle to form an awning or to the rear frame to form a dust guard.

9. The combination of a motor vehicle, supporting brackets secured to the rear thereof, a rectangular metal rear frame pivoted to said brackets, means for holding said frame in an upright or in an inclined position, a forward frame removably held upright in the vehicle, a casing extending across the back of the vehicle and having a slot therein, a roller journaled in said casing, a waterproof canvas sheet wound on said roller and passing through said slot, fastenings carried by the sheet whereby it may be secured over the frames to form an awning or to the rear frame to form a dust guard.

10. The combination of a motor vehicle, supporting brackets secured to the rear thereof, a rectangular metal rear frame pivoted to said brackets, means for holding said frame in an upright or in an inclined position, a forward frame removably held upright in the vehicle, a casing extending across the back of the vehicle and having a slot therein, a roller journaled in said casing, a waterproof canvas sheet wound on said roller and passing through said slot, a handle attached to said roller outside the casing, a ratchet wheel on said roller and a pawl on the casing engaging therewith, fastenings carried by the sheet whereby it may be secured over the frames to form an awning or to the rear frame to form a dust guard.

11. The combination of a motor vehicle, supporting brackets secured to the rear thereof, a rectangular metal rear frame pivoted to said brackets, stops for holding said frame in an upright or in an inclined position, a forward frame removably held upright in the vehicle, a casing extending across the back of the vehicle and having a slot therein, a roller journaled in said casing, a waterproof canvas sheet wound on said roller and passing through said slot, a handle attached to said roller outside the casing, a ratchet wheel on said roller and a pawl on the casing engaging therewith, fastenings carried by the sheet whereby it may be secured over the frames to form an awning or to the rear frame to form a dust guard, a folding wind screen at the front of the vehicle and an auxiliary frame to replace the upper part of the wind screen when folded.

12. The combination of a motor vehicle, supporting brackets secured to the rear thereof, a rectangular metal rear frame pivoted to said brackets, stops for holding said frame in an upright or in an inclined position, a forward frame removably held upright in the vehicle, a casing extending across the back of the vehicle and having a slot therein, a roller journaled in said casing, a waterproof canvas sheet wound on said roller and passing through said slot, a handle attached to said roller outside the casing, a ratchet wheel on said roller and a pawl on the casing engaging therewith, fastenings carried by the sheet whereby it may be secured over the frames to form an awning or to the rear frame to form a dust guard, a folding wind screen at the front of the vehicle, an auxiliary frame to replace the upper part of the wind screen when folded, brackets fixed to the front part of the vehicle, and straps to connect the front of the sheet to said brackets.

13. In a vehicle, the combination with a frame pivotally mounted at the rear of the vehicle, and angularly adjustable about its pivotal axis, means for locking said frame in adjusted position, a flexible extensible sheet carried at the rear of the vehicle, and means for removably securing the sheet to said frame.

14. In a vehicle, the combination with a frame pivotally mounted at the rear of the vehicle and angularly adjustable about its pivotal axis, means for locking said frame in adjusted position, stops for limiting the angular movement of the frame, a roller extending across the rear of the vehicle, an extensible flexible sheet mounted on said roller, and means for securing the free end of the sheet to the frame.

15. In a vehicle, the combination with the roller mounted at the rear of the vehicle, the flexible sheet carried by said roller, the rear supporting frame for said sheet, a second sheet supporting frame in advance of said rear frame, and securing means carried by the free end of the sheet for securing said end in place.

In testimony whereof I have signed my name to this specification in the presence of two subscribing witnesses.

HENRI SAUL SAMUEL.

Witnesses:
ALFRED J. BOULT,
HARRY B. BRIDGE.